(12) United States Patent
Kanda et al.

(10) Patent No.: US 11,662,809 B2
(45) Date of Patent: May 30, 2023

(54) IMAGE PICKUP APPARATUS CONFIGURED TO USE LINE OF SIGHT FOR IMAGING CONTROL AND CONTROL METHOD THEREOF

(71) Applicant: CANON KABUSHIKI KAISHA, Tokyo (JP)

(72) Inventors: Akihiko Kanda, Kanagawa (JP); Yoshihito Tamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 17/202,811

(22) Filed: Mar. 16, 2021

(65) Prior Publication Data

US 2021/0297587 A1 Sep. 23, 2021

(30) Foreign Application Priority Data

Mar. 18, 2020 (JP) .............................. JP2020-047545

(51) Int. Cl.
*G06V 40/16* (2022.01)
*H04N 23/60* (2023.01)
(Continued)

(52) U.S. Cl.
CPC .............. *G06F 3/013* (2013.01); *G06T 7/60* (2013.01); *G06T 7/70* (2017.01); *G06V 10/70* (2022.01); *G06V 40/165* (2022.01); *G06V 40/174* (2022.01); *G06V 40/18* (2022.01); *G06V 40/20* (2022.01); *H04N 23/611* (2023.01); *H04N 23/635* (2023.01); *H04N 23/64* (2023.01); *H04N 23/675* (2023.01); *G06T 2207/30201* (2013.01)

(58) Field of Classification Search
CPC ......... H04N 5/23222; H04N 5/232127; H04N 5/23219; H04N 5/232945; H04N 23/64; H04N 23/675; H04N 23/611; H04N 23/635; G06V 40/165; G06V 40/174
See application file for complete search history.

(56) References Cited

U.S. PATENT DOCUMENTS 8,542,885 B2 * 9/2013 Abe .................... H04N 5/23216
382/209
8,773,566 B2 * 7/2014 Wang ................. H04N 5/23222
348/333.02

(Continued)

FOREIGN PATENT DOCUMENTS

CN 103888658 A * 6/2014 ......... G06K 9/00275
JP H05100148 A 4/1993
(Continued)

*Primary Examiner* — John Villecco
(74) *Attorney, Agent, or Firm* — Rossi, Kimms & McDowell LLP

(57) ABSTRACT

An image pickup apparatus includes an image sensor configured to capture a subject image, a display unit configured to display image data generated with an output of the image sensor, a line-of-sight detector configured to detect a line of sight of a user viewing the display unit, a subject detector configured to detect a state of a subject from the image data, and a controller configured to control imaging according to the state of the subject at a gaze position corresponding to the line of sight in an imaging area of the image sensor.

17 Claims, 7 Drawing Sheets

(51) Int. Cl.
*H04N 23/611* (2023.01)
*H04N 23/63* (2023.01)
*H04N 23/67* (2023.01)
*G06V 40/18* (2022.01)
*G06F 3/01* (2006.01)
*G06T 7/60* (2017.01)
*G06T 7/70* (2017.01)
*G06V 10/70* (2022.01)
*G06V 40/20* (2022.01)

(56) References Cited

U.S. PATENT DOCUMENTS

| | | | | |
|---|---|---|---|---|
| 9,041,828 | B2* | 5/2015 | Kaneda | H04N 5/23219 348/222.1 |
| 9,124,814 | B2* | 9/2015 | Kim | H04N 5/23216 |
| 9,363,431 | B2* | 6/2016 | Rav-Acha | G06V 40/16 |
| 9,596,401 | B2* | 3/2017 | Thorn | H04N 5/23219 |
| 9,661,229 | B2* | 5/2017 | Lim | H04N 5/232939 |
| 10,291,841 | B2* | 5/2019 | Kim | G06V 40/16 |
| 10,542,206 | B2* | 1/2020 | Kimura | H04N 5/23293 |
| 11,388,331 | B2* | 7/2022 | Matsuo | H04N 5/232122 |
| 11,399,131 | B2* | 7/2022 | Kimura | H04N 5/23293 |
| 2004/0218916 | A1* | 11/2004 | Yamaguchi | G06V 40/175 348/E5.042 |
| 2007/0025722 | A1* | 2/2007 | Matsugu | H04N 5/23222 348/E5.042 |
| 2007/0195174 | A1* | 8/2007 | Oren | H04N 5/23216 348/222.1 |
| 2008/0205866 | A1* | 8/2008 | Sakamoto | G03B 15/00 396/263 |
| 2008/0239092 | A1* | 10/2008 | Sugino | H04N 5/23219 348/222.1 |
| 2008/0309796 | A1* | 12/2008 | Abe | H04N 5/23219 382/118 |
| 2008/0317285 | A1* | 12/2008 | Abe | H04N 5/23219 382/103 |
| 2009/0322896 | A1* | 12/2009 | Yoshizumi | H04N 5/23218 348/222.1 |
| 2011/0050915 | A1* | 3/2011 | Wang | H04N 5/232945 348/207.99 |
| 2012/0075500 | A1* | 3/2012 | Kaneda | H04N 5/23219 348/222.1 |
| 2012/0200761 | A1* | 8/2012 | Lim | H04N 5/23218 348/E5.024 |
| 2012/0206619 | A1* | 8/2012 | Nitta | H04N 5/232945 348/222.1 |
| 2014/0347507 | A1* | 11/2014 | Yanagidate | H04N 5/23296 348/211.2 |
| 2018/0007255 | A1* | 1/2018 | Tang | G06V 10/25 |
| 2018/0227481 | A1* | 8/2018 | Kimura | H04N 5/23293 |
| 2021/0157400 | A1* | 5/2021 | Funatsu | G06V 40/165 |
| 2022/0201221 | A1* | 6/2022 | Ogawa | H04N 5/2353 |

FOREIGN PATENT DOCUMENTS

| | | | |
|---|---|---|---|
| JP | 2001051338 A | * | 2/2001 |
| JP | 2007134845 A | * | 5/2007 |
| JP | 2010177859 A | * | 8/2010 |
| JP | 2015159550 A | * | 9/2015 |

* cited by examiner

IMAGE PICKUP APPARATUS CONFIGURED TO USE LINE OF SIGHT FOR IMAGING CONTROL AND CONTROL METHOD THEREOF

BACKGROUND OF THE INVENTION

Field of the Invention

The present invention relates to control over an image pickup apparatus.

Description of the Related Art

As disclosed in Japanese Patent Laid-Open No. ("JP") 5-100148, some image pickup apparatuses detect a line of sight (gaze position) of a user in an imaging screen and performs imaging according to a coincidence between the gaze position with a focus detecting area set in the imaging screen, in order to eliminate a delay in imaging timing due to an imaging instructing button operation.

However, the image pickup apparatus disclosed in JP 5-100148 performs imaging regardless of whether or not a subject included in the focus detecting area is in a good state suitable for imaging, and thus may not acquire a captured image as intended by the user.

SUMMARY OF THE INVENTION

The present invention provides an image pickup apparatus, which can image a subject in a good state utilizing a line of sight of a user.

An image pickup apparatus according to one aspect of the present invention includes an image sensor configured to capture a subject image, a display unit configured to display image data generated with an output of the image sensor, a line-of-sight detector configured to detect a line of sight of a user viewing the display unit, a subject detector configured to detect a state of a subject from the image data, and a controller configured to control imaging according to the state of the subject at a gaze position corresponding to the line of sight in an imaging area of the image sensor. At least one processor or circuit is configured to perform a function of at least one of the subject detector and the controller.

A control method for an image pickup apparatus corresponding to the above image pickup apparatus and a storage medium storing a program of the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
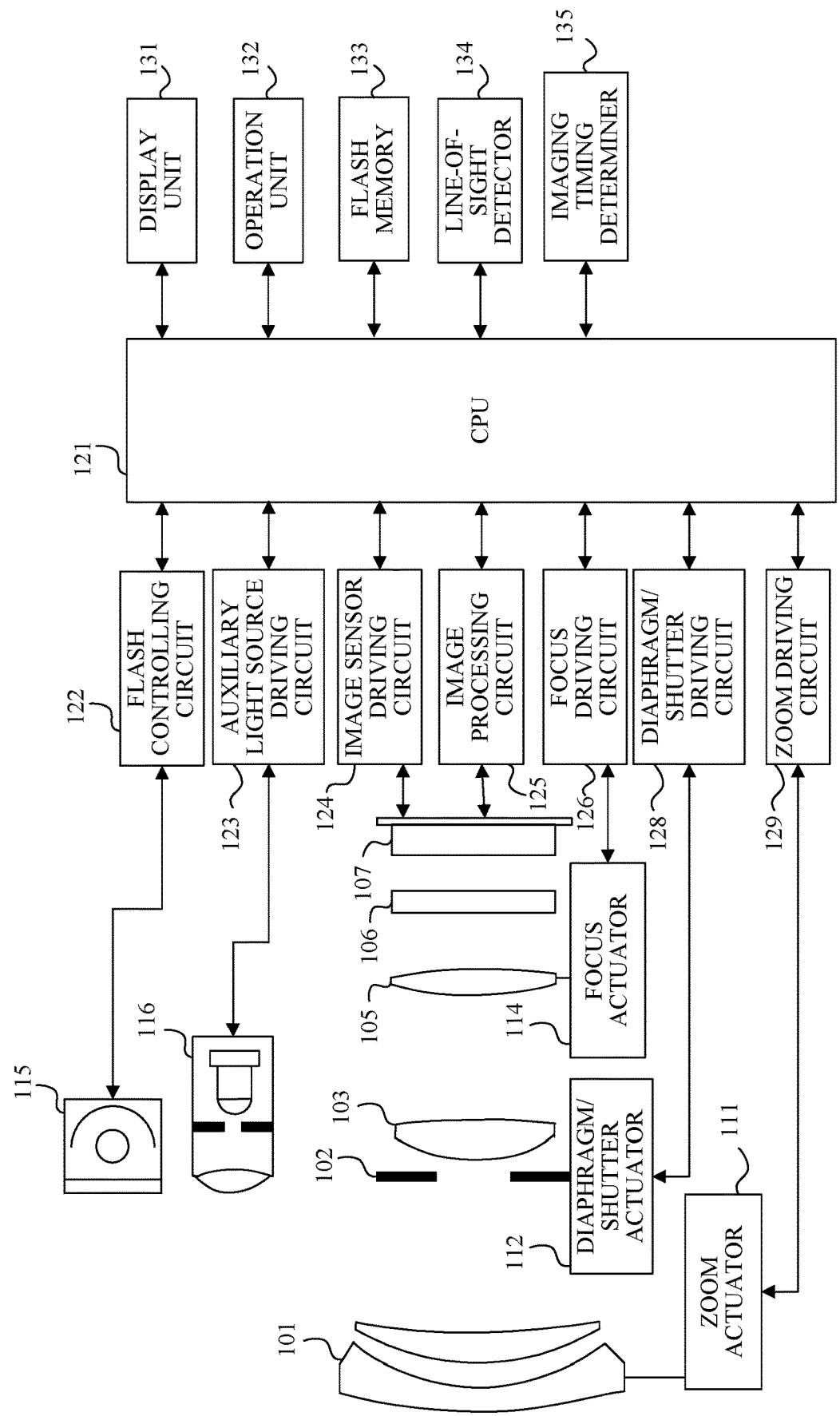
FIG. 1 is a block diagram illustrating a configuration of an image pickup apparatus according to a first embodiment of the present invention.

FIG. 1 illustrates a configuration of an image pickup apparatus according to a first embodiment of the present invention. This embodiment will discuss a configuration of a digital camera as the image pickup apparatus, but the image pickup apparatus according to the present invention includes those mounted on various devices such as an image processing apparatus, an information processing apparatus, and an electronic apparatus.

The image pickup apparatus includes an imaging optical system that includes a first lens unit 101, an diaphragm/shutter 102, a second lens unit 103, a third lens unit 105, and an optical low-pass filter 106, an image sensor 107, an electronic flash 115, and AF (autofocus) auxiliary light source 116. The image pickup apparatus further includes a zoom actuator 111, an diaphragm/shutter actuator 112, a focus actuator 114, a CPU 121, various circuits 122 to 129, a display unit 131, an operation unit 132, a flash memory 133, a line-of-sight (or visual line) detector (or detecting unit) 134, and an imaging timing determiner (or determination unit) 135.

The imaging optical system images light from the subject. The first lens unit 101 and the second lens unit 103 move in the optical axis direction during a magnification variation (zooming). The third lens unit 105 moves in the optical axis direction during focusing. The diaphragm/shutter 102 changes an aperture diameter to adjust a light amount, and to control an exposure amount of the image sensor 107 in still image capturing. The optical low-pass filter 106 reduces a false color and moiré. The image sensor 107 is a photoelectric conversion element such as a CMOS sensor or a CCD sensor, and is driven by the sensor driving circuit 124 to capture a subject image (optical image) formed by the imaging optical system and to output an imaging signal. The image processing circuit 125 generates image data by performing various processing such as a gamma conversion and a color interpolation for the imaging signal from the image sensor 107.

The zoom actuator 111 is driven by the zoom driving circuit 129 to move the first lens unit 101 and the second lens unit 103 in the optical axis direction. The diaphragm/shutter actuator 112 is driven by the diaphragm/shutter driving circuit 128 to change the aperture diameter of the diaphragm/shutter 102. The focus actuator 114 is driven by the focus driving circuit 126 during AF to move the third lens unit 105 in the optical axis direction.

The electronic flash 115 is controlled by the flash controlling circuit 122 and emits flashlight that illuminates the subject during imaging. The AF auxiliary light source 116 is driven by the auxiliary light source driving circuit 123, and projects a predetermined patterned image onto a low-luminance or low-contrast subject to improve the focus detecting performance.

The CPU 121 is a computer including a calculator, a ROM, a RAM, an A/D converter, a D/A converter, a communication interface circuit, and the like. The CPU 121 executes AF processing, imaging (or image pickup) processing, image processing, recording processing, and the like according to a computer program stored in the ROM, and controls the operation of various circuits. More specifically, the CPU 121 controls the zoom actuator 111 through the zoom driving circuit 129 in response to a zoom instruction from the operation unit 132. The CPU 121 performs a focus detection using the image data from the image processing circuit 125 in response to the imaging preparation instruction from the operation unit 132, performs AF processing that controls the position of the third lens unit 105 through the focus driving circuit 126 according to the result, and instructs the diaphragm/shutter 102 to change the aperture diameter through the diaphragm/shutter driving circuit 128 according to the luminance information acquired from the image data. The CPU 121 instructs the diaphragm/shutter 102 to perform a shutter operation in response to a still image capturing instruction from the operation unit 132 or a notice of the imaging timing from the imaging timing determiner 135, and instructs the image processing circuit 125 to generate still image data for recording use. The CPU 121 instructs the image processing circuit 125 to generate motion image data for recording use while controlling the aperture diameter of the diaphragm/shutter 102 in response to the movie capturing instruction from the operation unit 132. The CPU 121 serves as a subject detector (or subject detecting unit) configured to detect the subject and the state of the subject (which will be described later) from the image data.

The display unit 131 includes a display device such as an LCD, and displays an image before imaging (preview image) corresponding to the image data as an EVF (electronic viewfinder), in-focus states in a plurality of focus detecting areas, and an image for recording use after imaging. The display unit 131 displays various information such as information on an imaging mode.

The operation unit 132 includes various operation switches operable by the user, and outputs to the CPU 121 signals indicating various instructions such as the zoom instruction, the imaging preparation instruction, and the imaging instruction.

The flash memory 133 is a recording medium that can be attached to and detached from the image pickup apparatus, and records the image data for recording use and the like.

The line-of-sight detector 134 includes an infrared light emitter and a light receiving sensor disposed near the display unit 131, receives, through the light receiving sensor, a Purkinje image formed by the infrared light emitted from the infrared light emitter and reflected by the eyeball (cornea) of the user viewing the display unit 131, and converts it into an electric signal. The line-of-sight detector 134 detects a rotation angle of the user's eyeball or the user's line of sight (which is a direction to which the user pays attention and also referred to as a line-of-sight direction) using an electric signal from the light receiving sensor, and uses that information to the CPU 121. From the user's line of sight detected by the line-of-sight detector 134, the CPU 121 identifies the position to which the user pays attention (the position where the line of sight is directed: hereinafter referred to as a gaze or attention position) in the imaging screen (preview image) as the imaging area, and outputs this information to the imaging timing determiner 135.

The line-of-sight detector 134 may be provided with a camera that images the eye of the user viewing the display unit 131, and detect the user's line of sight from the image data acquired by the camera.

The imaging timing determiner 135 determines the imaging timing according to the user's gaze position acquired from the line-of-sight detector 134 and the state of the subject detected by the CPU 121 from the image data as described above, and informs the CPU 121 of the imaging timing. The CPU 121 that is informed of the imaging timing automatically controls imaging for acquiring a still image for recording use (hereinafter referred to as automatic imaging control). A controller (or control unit) includes the CPU 121 and the imaging timing determiner 135.

The state of the subject in this embodiment indicates the state of the face of the subject (organs such as an eye and mouth), a face direction of the subject, and the orientation of the subject. The imaging timing determiner 135 determines the imaging timing when it determines that the face or orientation of the subject located at the user's gaze position is in a state suitable for imaging.

Techniques for detecting the face of the subject include a learning method represented by a neural network, a template matching method using the image data to detect characteristic parts of physical shapes such as an eye, a nose, a mouth, and a face contour, a face detecting method that detects a feature amount such as a skin color and an eye shape from image data and utilizes a statistical analysis, a face detecting method based on the fact that the face is located near a just previously detected face position, a face detecting method that refers to a cloth color, a method that enables a face to be easily recognized as the face position is closer to the center of the imaging screen, and the like.

In this embodiment, the CPU 121 uses a method for detecting a pair of eyes (both eyes), a nose, a mouth, and a contour of a face from the image data, and for determining a subject area (face area) including a person's face from their relative positions. The CPU 121 detects the subject area for a subject such as a human body other than the face, an animal, or a vehicle by the same method as the above face detecting method.

Various methods can be used to detect the orientation of the subject. In this embodiment, when the subject is a human body, the CPU 121 detects the orientation of the face based on the position of the organ relative to the entire face, estimates joint parts of the human body based on the image data using deep learning, and detects the orientation of the human body (bending and stretching of the joint, orientation of the body, etc.) by connecting the estimated joint parts. The CPU 121 can also detect the orientation of the subject, such as an animal and a vehicle other than the human body, by the estimation method using the deep learning.

In order for the imaging timing determiner 135 to determine whether or not the subject is in the state suitable for imaging, this embodiment may use a method for acquiring and using reference image data that indicates the state of the subject suitable for imaging (satisfying a predetermined condition) which has been previously stored in an unillustrated memory in the image pickup apparatus or on a network to which the image pickup apparatus is connectable. For example, this embodiment may store reference image data that shows a face when a smile or an eye faces the image pickup apparatus, and reference image data that shows a specific orientation that the subject often takes before imaging, such as jumping or making a V-shape with fingers, compare the reference image data with the image data from the image processing circuit 125, and detect a face or orientation matching the reference image data from the image data. When the face or orientation cannot be detected, a state in which a ratio of the size of the subject area (that is, the subject) to the imaging screen is equal to or greater than a predetermined value may be determined to be the state of the subject suitable for imaging. The predetermined value referred to herein may be, for example, 50% of the horizontal angle of view.

Figure 2A:
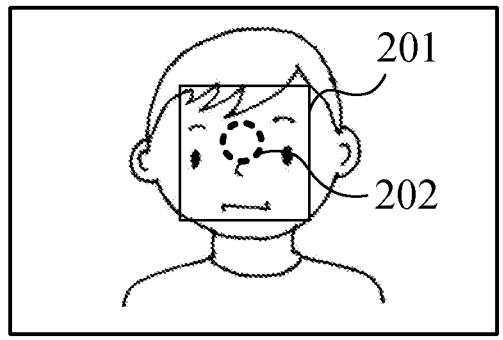
FIGS. 2A and 2B illustrate an example for determining a state of a subject according to the first embodiment.
Figure 2B:
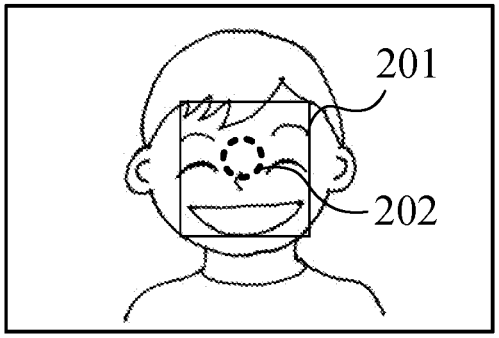

FIGS. 2A and 2B illustrate the state of the face of the subject viewed by the user through the display unit 131 in the image pickup apparatus as an example of the state of the subject. FIG. 2A illustrates that the face and eyes of the subject face the image pickup apparatus but the face expression is not smiling, and FIG. 2B illustrates that the face and eyes of the subject face the image pickup apparatus and the face expression is smiling. Reference numeral 201 denotes a subject frame superimposed on the preview image so as to indicate the face area detected by the CPU 121, and reference numeral 202 denotes a gaze mark superimposed on the preview image so as to indicate the gaze position according to the detection result by the line-of-sight detector 134.

In FIG. 2A, the gaze position of the user and the face area of the subject coincide with each other (or the face area includes the gaze position), but the subject does not smile, so the imaging timing determiner 135 determines that it is not the state of the subject suitable for imaging. On the other hand, since FIG. 2B shows that the face area of the subject includes the gaze position of the user and the subject is smiling, the imaging timing determiner 135 determines that the subject is in the state suitable for imaging. The imaging timing determiner 135 determines that the state of the subject is in the state suitable for imaging (that is, satisfies the predetermined condition) and then determines the imaging timing, so that the CPU 121 automatically provides imaging control. Whether or not the subject is smiling is determined by a known technique such as a learning technique using a discriminator that distinguishes between a smile and other face expressions.

The predetermined condition (referred to as an imaging timing determining condition hereinafter) that determines the imaging timing may not be a smile, but be the face or eyes of the subject are facing the image pickup apparatus and the state continues for a predetermined time. At this time, the orientation of the eye of the subject may be determined by detecting, through the organ detection, a positional relationship among the outer corners of the eye, the inner corner of the eye, and the center of the pupil. The imaging timing determining condition may be set to the state in which the subject's eye faces the user's gaze position continues for a predetermined time.

Figure 3:
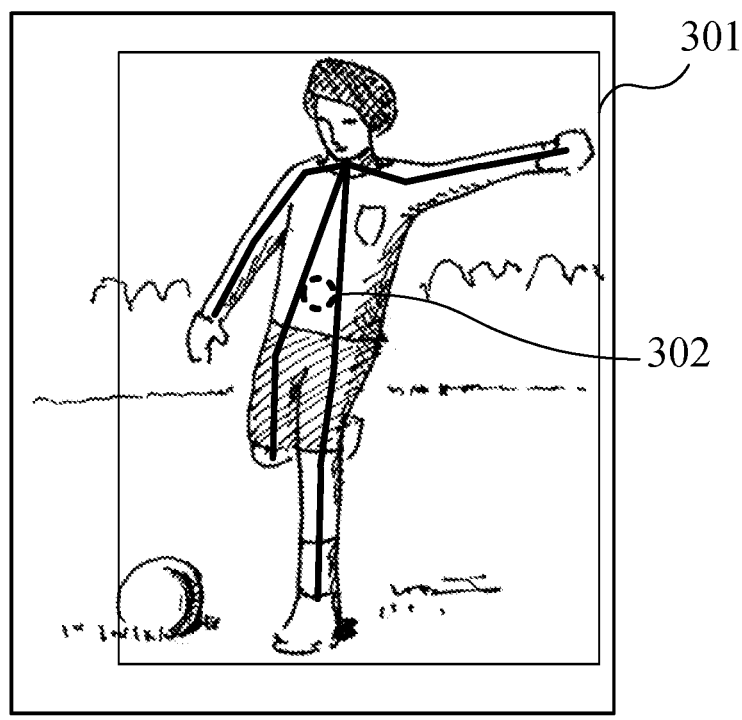
FIG. 3 illustrates another example for determining the state of the subject according to the first embodiment.

Whether or not the state of the subject is suitable for imaging may be determined by combining the smile, the face direction, and the eye direction of the subject. FIG. 3 illustrates an example in which the subject is a person and the state of the subject can be determined as the state suitable for imaging based on the detection result of the orientation. This figure shows the state just before the subject kicks a soccer ball. Reference numeral 301 denotes a subject frame superimposed on a preview image, and reference numeral 302 denotes a gaze mark superimposed on the preview image. The imaging timing determiner 135 determines the imaging timing by determining that the state is suitable for imaging when the coincidence degree between the detection result of the orientation of the subject located at the gaze position and the previously stored orientation as the state suitable for imaging is equal to or greater than a predetermined value.

Figure 4A:
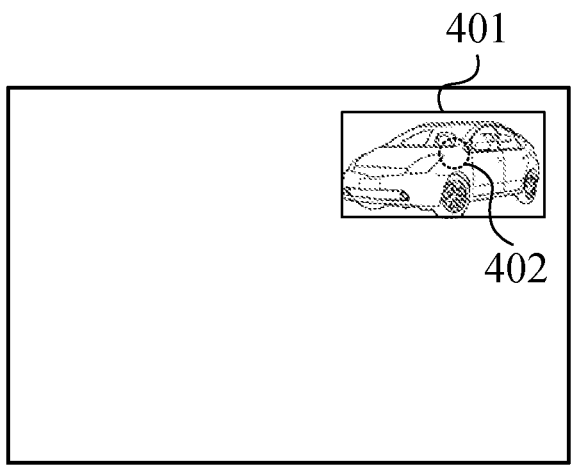
FIGS. 4A and 4B illustrates still another example for determining the state of the subject according to the first embodiment.
Figure 4B:
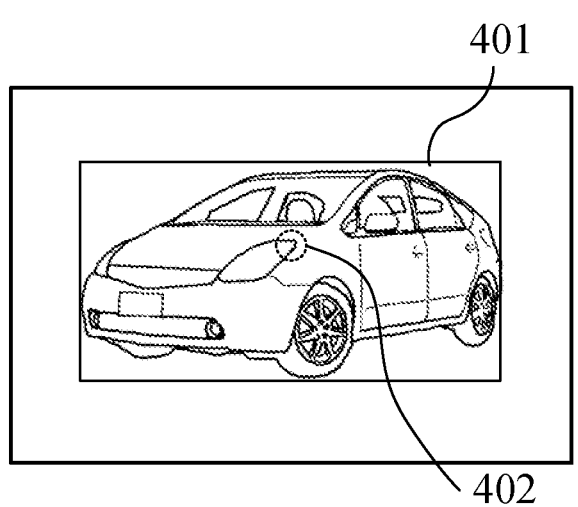

FIGS. 4A and 4B illustrate an example when the subject is a vehicle (car). Reference numeral 401 denotes a subject frame superimposed on a preview image, and reference numeral 402 denotes a gaze mark superimposed on the preview image. In FIG. 4A, the gaze position of the user and the subject area coincide with each other, but since the ratio of the size of the subject to the imaging screen is smaller than the predetermined value, the imaging timing determiner 135 does not determine that the state of the subject is suitable for imaging. On the other hand, in FIG. 4B, since the ratio of the size of the subject to the imaging screen is equal to or greater than the predetermined value, the imaging timing determiner 135 determines that the state is suitable for imaging.

Figure 5:
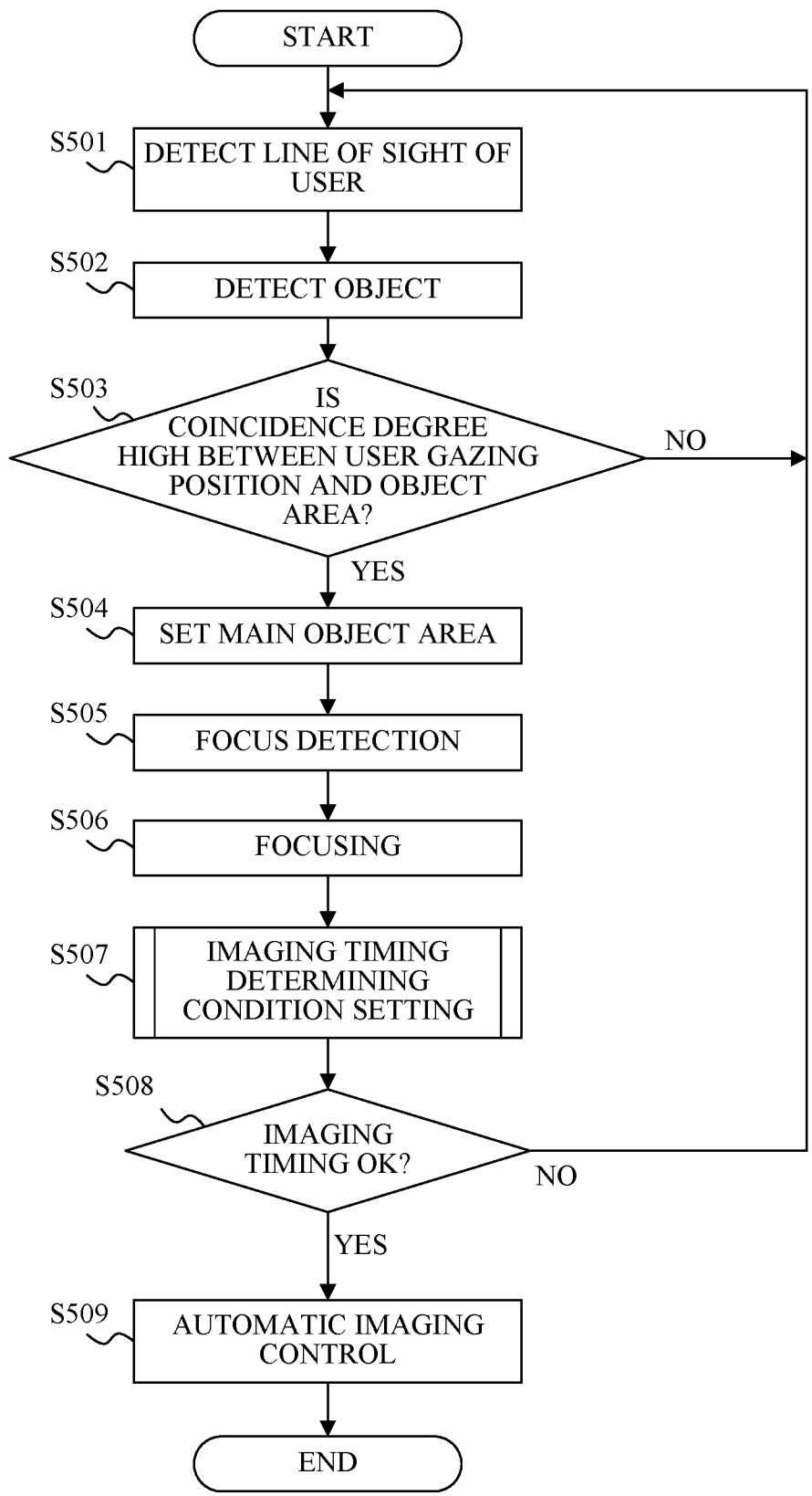
FIG. 5 is a flowchart showing imaging processing executed in the first embodiment.

A flowchart in FIG. 5 shows imaging processing executed by the CPU 121 and the imaging timing determiner 135 in accordance with a computer program in this embodiment. In the step S501, the CPU 121 detects the user's line of sight through the line-of-sight detector 134, and identifies the user's gaze position in the preview image from the result.

Next, in the step S502, the CPU 121 detects a subject such as a person, a face, or a vehicle from the image data of the preview image. At this time, the CPU 121 may automatically detect the subject from the entire image data, or may detect the subject from the image data within an area specified by the user operation such as touching a display screen of the display unit 131 with a finger. The CPU 121 sets a rectangular area including the detected subject as the subject area.

Next, in the step S503, the CPU 121 instructs the imaging timing determiner 135 to determine the coincidence degree between the gaze position detected in the step S501 and the subject area. More specifically, the imaging timing determiner 135 determines that the coincidence degree is high when the gaze position is included in the subject area, and that the coincidence degree is low otherwise. If the coincidence degree is high, the CPU 121 proceeds to the step S504, and if the coincidence degree is low, the CPU 121 returns to the step S501.

In the step S504, the CPU 121 sets the subject area (corresponding to the line of sight) including the gaze position to the subject area (referred to as a main subject area hereinafter) as the target imaging area. Then, in the step S505, the CPU 121 performs a focus detection for the main subject area. In the step S506, the CPU 121 performs focusing according to the result of the focus detection performed in the step S505.

Next, in the step S507, the CPU 121 sets the imaging timing determining condition to the main subject area. The detailed processing in this step will be described later. The imaging timing determiner 135 is informed of the imaging timing determining condition set by the CPU 121.

Next, in the step S508, the CPU 121 instructs the imaging timing determiner 135 to determine whether the state of the subject in the main subject area satisfies the imaging timing determining condition. When the state of the subject satisfies the imaging timing determining condition, the imaging timing determiner 135 informs the CPU 121 of the imaging timing in the step S509. Thereby, the CPU 121 automatically controls imaging and ends this flow. At this time, the CPU 121 may change the display form (color, shape, etc.) of the subject frame or the gaze mark in order to inform the user that automatic imaging control is to be performed.

On the other hand, if the state of the subject does not satisfy the imaging timing determining condition, the imaging timing determiner 135 informs the CPU 121 of the fact. Thereby, the CPU 121 returns to the step S501.

Figure 6:
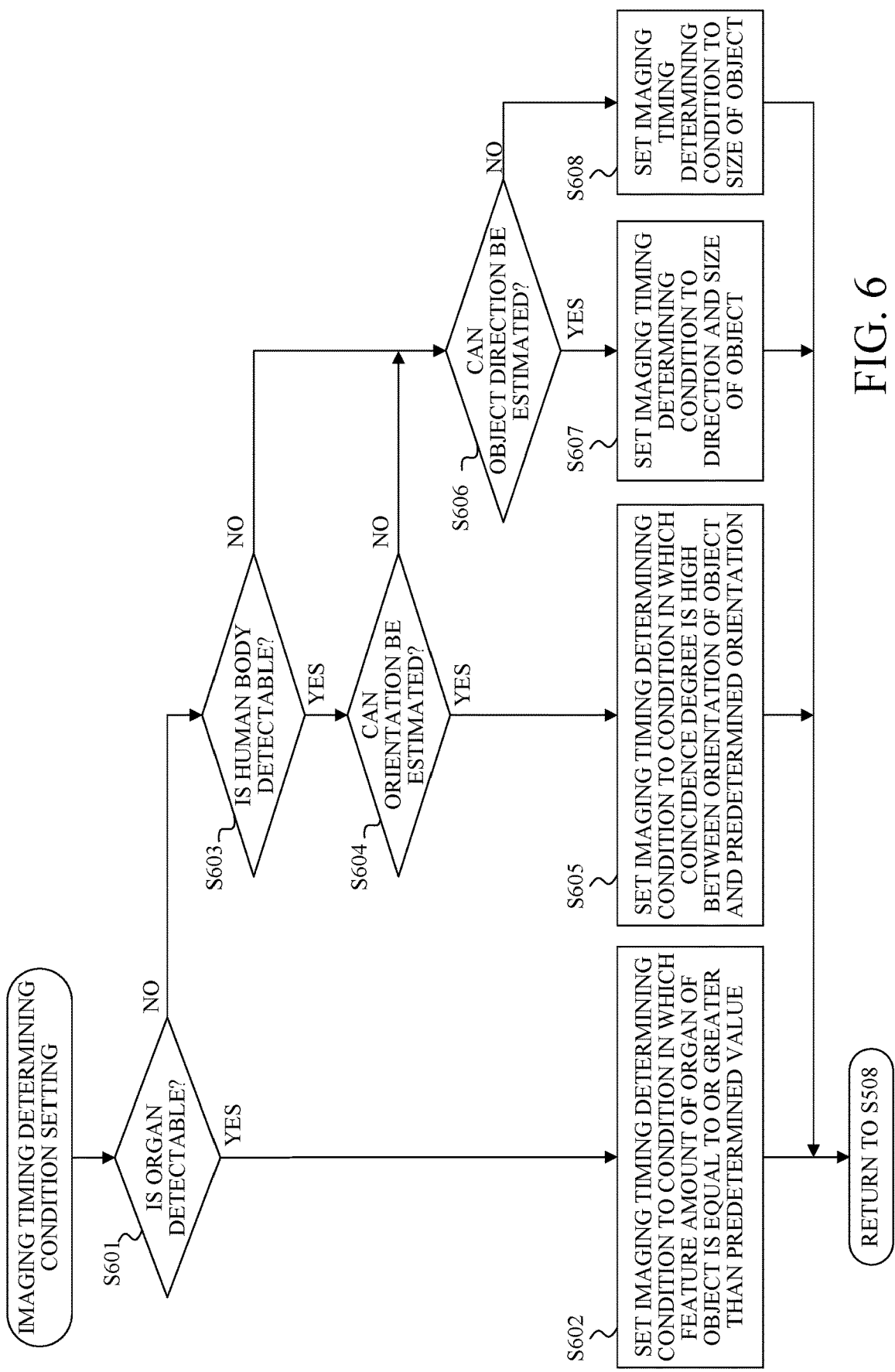
FIG. 6 is a flowchart showing imaging timing determining processing executed in the first embodiment.

A flowchart of FIG. 6 shows setting processing of the imaging timing determining condition executed by the CPU 121 in the step S507 in FIG. 5. First, in the step S601, the CPU 121 determines whether or not the organ of the subject is detectable by the detection method described above, and if it is detectable, the CPU 121 proceeds to the step S602, otherwise it proceeds to the step S603.

In the step S602, the CPU 121 sets the imaging timing determining condition when a feature amount of the organ of the subject is equal to or greater than a predetermined value. For example, assume that the feature amount of the organ is equal to or greater than the predetermined value when the face as the subject is smiling as illustrated in FIG. 2B. Alternatively, the feature amount may be set equal to or greater than the predetermined value when the eyes as the organ wink or the mouth as the organ widely opens. The CPU 121 that has set the imaging timing determining condition in this way proceeds to the step S508 in FIG. 5.

In the step S603, the CPU 121 determines whether or not the human body is detectable by the detection method described above, and if it is detectable, the CPU 121 proceeds to the step S604, otherwise it proceeds to the step S607.

In the step S604, the CPU 121 determines whether or not the orientation of the human body detected in the step S603 can be estimated by the estimation method described above, and if it can be estimated, the CPU 121 proceeds to the step S605, otherwise it proceeds to the step S606.

In the step S605, the CPU 121 sets the imaging timing determining condition when the orientation of the subject has a high coincidence degree with a predetermined orientation. As described above, the predetermined orientation is an orientation (state) of the subject suitable for imaging, which is previously stored in the memory in the image pickup apparatus or on the network. The CPU 121 that has set the imaging timing determining condition in this way proceeds to the step S508 in FIG. 5.

In the step S606, the CPU 121 determines whether or not the orientation of the subject can be estimated, and if it can be estimated, the CPU 121 proceeds to the step S607, otherwise it proceeds to the step S608. The orientation of the subject is the orientation of the face or body. The orientation of the face is estimated from the detection result of the facial organs as described above, and the orientation of the body is estimated from the detection result of the orientation of the subject as described above.

In the step S607, the CPU 121 sets the imaging timing determining condition to the orientation and size of the subject. That is, as described above, the imaging timing determining condition is set to a condition in which the face or body of the subject faces the image pickup apparatus and the ratio of the size of the subject to the imaging screen is equal to or greater than the predetermined value. On the other hand, in the step S608, the CPU 121 sets the imaging timing determining condition to the size of the subject. That is, the imaging timing determining condition is set to a condition in which the ratio of the size of the subject to the imaging screen is equal to or greater than the predetermined value. The CPU 121 that has set the imaging timing determining condition in this way proceeds to the step S508 in FIG. 5.

This embodiment can automatically image a subject in a good state utilizing the line of sight of the user.

Second Embodiment

Figure 7:
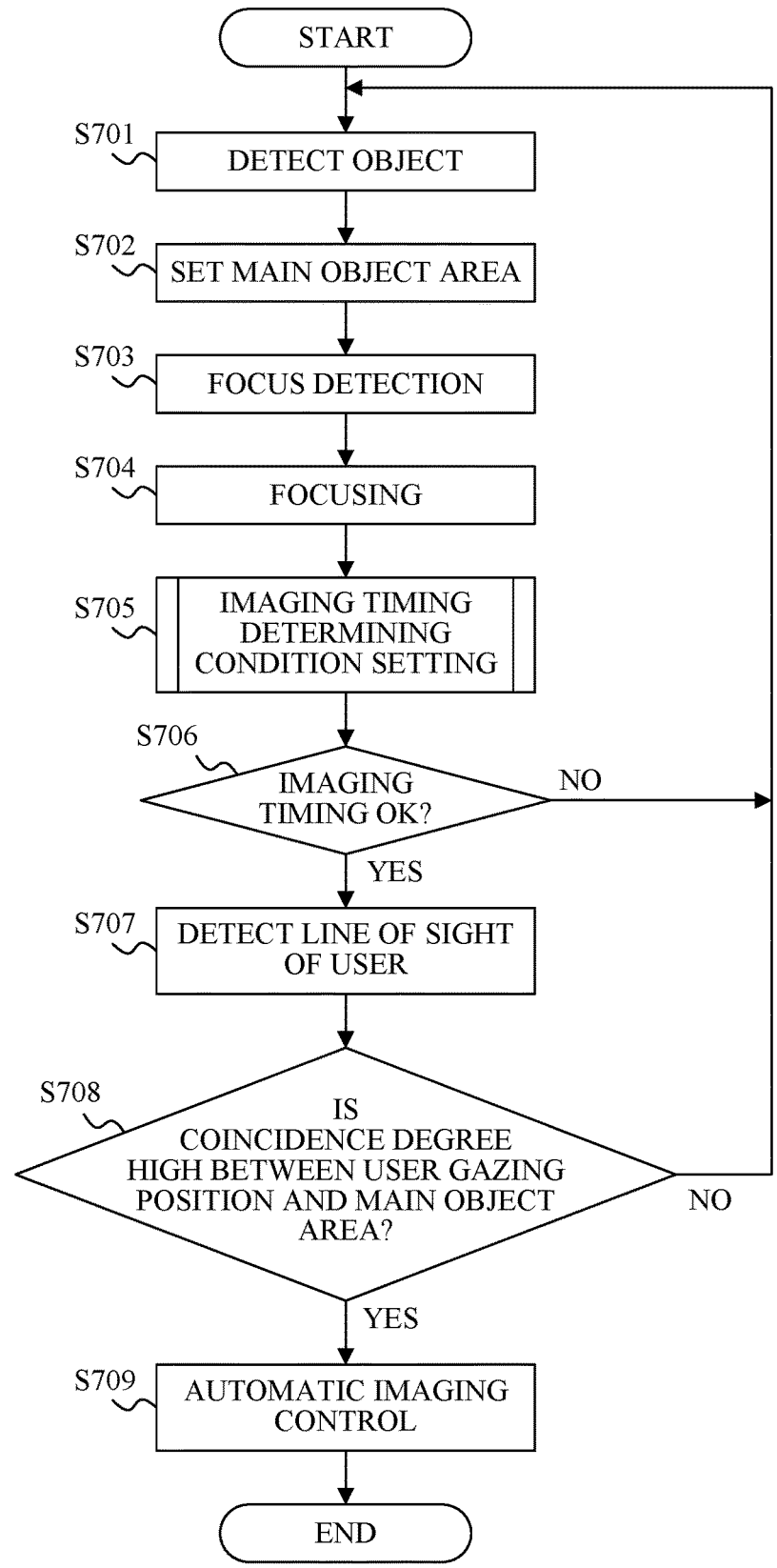
FIG. 7 is a flowchart showing imaging processing executed in a second embodiment of the present invention.

A description will now be given of a second embodiment of the present invention. The configuration of the image pickup apparatus in this embodiment is the same as that of the first embodiment. A flowchart of FIG. 7 shows imaging processing executed by the CPU 121 and the imaging timing determiner 135 according to a computer program in this embodiment. This embodiment first sets the main subject area through a subject detection, then sets the imaging timing determining condition, and automatically controls imaging when the coincidence degree between the gaze position and the main subject area is high.

More specifically, in the step S701, the CPU 121 detects the subject in the same manner as that in the step S502 in FIG. 5 and in the step S702, sets the subject area in which the subject is detected, to the main subject area. At this time, when there are a plurality of subject areas, it sets one of them located at a predetermined position such as the center of the imaging screen or a user specified subject area to the main subject area. Then, the CPU 121 performs the focus detection for the main subject area in the step S703, and provides focusing in the step S704.

Next, in the step S705, the CPU 121 sets the imaging timing determining condition as described with reference to the step S507 in FIG. 5 and FIG. 6. Next, in the step S706, the CPU 121 instructs the imaging timing determiner 135 to determine whether the state of the subject in the main subject area satisfies the imaging timing determining condition. If the state of the subject satisfies the imaging timing determining condition, the imaging timing determiner 135 informs the CPU 121 of the fact and the CPU 121 proceeds to the step S707, otherwise it returns to the step S701.

In the step S707, the CPU 121 detects the user's line of sight through the line-of-sight detector 134 and specifies the gaze position similar to the step S501. Then, in the step S708, the CPU 121 determines whether or not the coincidence degree between the gaze position and the main subject area is high, and if it is high, the CPU 121 proceeds to the step S709, otherwise it returns to the step S701. In the step S709, the CPU 121 automatically controls imaging. Then, it ends this flow.

This embodiment does not have to select the main subject area by detecting the line of sight of the user, and thus can quickly select the main subject area. After the main subject area is set, automatic imaging control starts if the coincidence degree between the main subject area and the gaze position is determined to be high by detecting the line of sight of the user.

Third Embodiment

Figure 8:
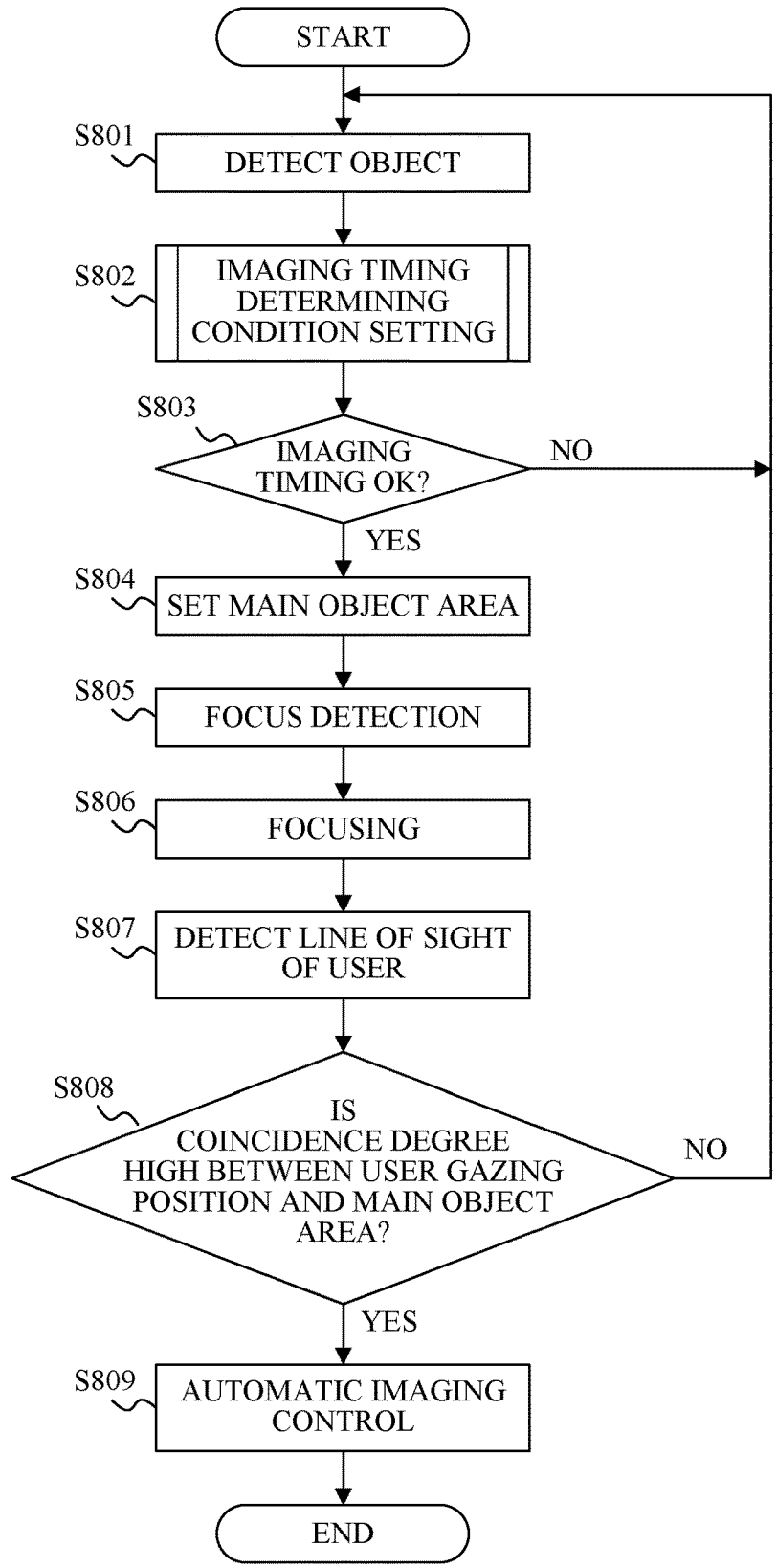
FIG. 8 is a flowchart showing imaging processing executed in a third embodiment of the present invention.

A description will now be given of a third embodiment according to the present invention. The configuration of the image pickup apparatus in this embodiment is the same as that of the first embodiment. A flowchart of FIG. 8 shows imaging processing executed by the CPU 121 and the imaging timing determiner 135 according to a computer program in this embodiment. This embodiment first detects the subject, then sets the imaging timing determining condition and then the main subject area, and automatically controls imaging when the coincidence degree between the gaze position and the main subject area is high.

More specifically, the CPU 121 detects the subject in the step S801 similar to the step S502 in FIG. 5, and sets the imaging timing determining condition in the step S802 as described with reference to the steps S507 in FIG. 5 and FIG. 6.

Next, in the step S803, the CPU 121 instructs the imaging timing determiner 135 to determine whether the state of the subject in the subject area satisfies the imaging timing determining condition. If the state of the subject satisfies the imaging timing determining condition, the imaging timing determiner 135 informs the CPU 121 of the fact and the CPU 121 proceeds to the step S804, otherwise it returns to the step S801.

In the step S804, the CPU 121 sets a subject area in which the state of the subject satisfies the imaging timing determining condition to the main subject area, then performs a focus detection for the main subject area in the step S805, and then provides focusing in the step S806.

Next, in the step S807, the CPU 121 detects the line of sight of the user through the line-of-sight detector 134, and specifies the gaze position similar to the step S501. Then, in the step S808, the CPU 121 determines whether or not the coincidence degree between the gaze position and the main subject area is high, and if it is high, the CPU 121 proceeds to the step S809, otherwise it returns to the step S801. In the step S809, the CPU 121 automatically controls imaging. Then, the CPU 121 ends this flow.

This embodiment sets a subject that satisfies the imaging timing determining condition to the main subject area without selecting the main subject area by detecting the line of sight of the user, and thus can quickly select the main subject area. After the main subject area is set, automatic imaging control starts if the coincidence degree between the main subject area and the gaze position is determined to be high by detecting the line of sight of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can image a subject in a good state utilizing a line of sight of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-47545, filed on Mar. 18, 2020, which is hereby incorporated by reference herein in its entirety.

What is claimed is:

1. An image pickup apparatus comprising:
   an image sensor configured to capture a subject image;
   a display unit configured to display image data generated with an output of the image sensor;
   a line-of-sight detector configured to detect a line of sight of a user viewing the display unit;
   a subject detector configured to detect a state of a subject from the image data; and
   a controller configured to control imaging according to the state of the subject at a gaze position corresponding to the line of sight in an imaging area of the image sensor,
   wherein the controller is further configured to set a target imaging area in which the state of the subject satisfies a predetermined condition for imaging control, and control imaging when the line of sight corresponding to the target imaging area is detected, and
   wherein at least one processor or circuit is configured to perform a function of at least one of the subject detector and the controller.

2. The image pickup apparatus according to claim 1, wherein the subject includes a face, and the state of the subject includes at least one of an eye direction, a face expression, and a face direction.

3. The image pickup apparatus according to claim 1, wherein the subject includes a body, and the state of the subject includes at least one of an orientation and direction of the body.

4. The image pickup apparatus according to claim 1, wherein the state of the subject includes a size of the subject in the imaging area.

5. The image pickup apparatus according to claim 1, wherein the subject detector detects the subject in a user designated area in the imaging area.

6. The image pickup apparatus according to claim 1, wherein the controller sets the target imaging area when the state of the subject satisfies the predetermined condition.

7. The image pickup apparatus according to claim 6, wherein the state of the subject includes an eye direction, and the predetermined condition is that the eye direction coincides with the line of sight.

8. The image pickup apparatus according to claim 6, wherein the state of the subject includes a face expression, and the predetermined condition is that the face expression has a smile.

9. The image pickup apparatus according to claim 6, wherein the state of the subject includes a direction of a face or body, and the predetermined condition is that the face or body faces the image pickup apparatus.

10. The image pickup apparatus according to claim 6, wherein the state of the subject includes an orientation of a body, and the predetermined condition is that the orientation is a specific orientation.

11. The image pickup apparatus according to claim 6, wherein the controller acquires reference image data including the state of the subject that satisfies the predetermined condition, compares the reference image data with the image data generated with the output of the image sensor, and determines whether the state of the subject satisfies the predetermined condition.

12. The image pickup apparatus according to claim 6, wherein the state of the subject includes a size of the subject in the imaging area, and the predetermined condition is that a ratio of the size of the subject to the imaging area is equal to or greater than a predetermined value.

13. The image pickup apparatus according to claim 6, wherein the display unit displays the gaze position superimposed on the image data, and the controller changes a display form of the gaze position so as to inform that the state of the subject satisfies the predetermined condition.

14. The image pickup apparatus according to claim 1, wherein the controller selects the predetermined condition from a plurality of conditional candidates and sets the target imaging area to an area in which the selected predetermined condition is satisfied.

15. The image pickup apparatus according to claim 14, wherein based on a result of detection of the subject, the controller selects the predetermined condition from the plurality of conditional candidates.

16. A control method for an image pickup apparatus including a display unit configured to display image data generated with an output of an image sensor configured to capture a subject image, the control method comprising the steps of:
   detecting a line of sight of a user viewing the display unit;
   detecting a state of a subject from the image data; and
   controlling imaging according to the state of the subject at a gaze position corresponding to the line of sight in the imaging area of the image sensor,
   wherein, in the controlling, a target imaging area in which the state of the subject satisfies a predetermined condition for imaging control is set, and imaging is controlled when the line of sight corresponding to the target imaging area is detected.

17. A non-transitory computer-readable storage medium storing a program for causing a computer of an image pickup apparatus including a display unit configured to display image data generated with an output of an image sensor configured to capture a subject image, to execute the control method according to claim 16.

* * * * *